(12) United States Patent
Culligan

(10) Patent No.: US 7,833,470 B2
(45) Date of Patent: *Nov. 16, 2010

(54) INJECTION MOLDED ARTICLE AND METHOD FOR THE MANUFACTURE THEREOF

(75) Inventor: Sean W. Culligan, Delmar, NY (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/794,822

(22) Filed: Jun. 7, 2010

(65) Prior Publication Data

US 2010/0249294 A1 Sep. 30, 2010

Related U.S. Application Data

(63) Continuation of application No. 12/254,920, filed on Oct. 21, 2008.

(51) Int. Cl.
*B29C 45/00* (2006.01)

(52) U.S. Cl. .................................................. 264/645

(58) Field of Classification Search .................. 264/645
See application file for complete search history.

(56) References Cited

U.S. PATENT DOCUMENTS

| | | | |
|---|---|---|---|
| 3,383,435 | A | 5/1968 | Cizek |
| 3,952,072 | A | 4/1976 | Yonemitsu et al. |
| 4,681,906 | A | 7/1987 | Abolins et al. |
| 4,900,786 | A | 2/1990 | Abolins et al. |
| 5,294,655 | A | 3/1994 | Lee, Jr. |
| 5,397,822 | A | 3/1995 | Lee, Jr. |
| 5,576,387 | A | 11/1996 | Chambers |
| 6,201,067 | B1 | 3/2001 | Cheung et al. |
| 6,350,514 | B1 | 2/2002 | Venderbosch |
| 6,462,167 | B1 | 10/2002 | Nodera et al. |
| 7,358,293 | B2 | 4/2008 | Agarwal |
| 2002/0137824 | A1 | 9/2002 | Hong et al. |
| 2003/0125430 | A1* | 7/2003 | Adedeji et al. ............... 524/115 |
| 2005/0154100 | A1 | 7/2005 | Kosaka |
| 2005/0171266 | A1 | 8/2005 | Matthijssen et al. |
| 2006/0058432 | A1 | 3/2006 | Perego et al. |
| 2007/0060677 | A1 | 3/2007 | Yoshida et al. |
| 2007/0100070 | A1 | 5/2007 | Todt et al. |
| 2007/0138702 | A9 | 6/2007 | Matthijssen et al. |
| 2007/0249766 | A1 | 10/2007 | Ishii et al. |

FOREIGN PATENT DOCUMENTS

| | | |
|---|---|---|
| EP | 747436 A2 | 12/1996 |
| EP | 0885929 A1 | 12/1998 |
| WO | WO2005/097897 A1 | 10/2005 |

OTHER PUBLICATIONS

Intrnational Search Report; International Application No. PCT/US2009/061144; International Filing Date Oct. 19, 2009; 9 pages.
Written Opinion of the International Searching Authority; International Application No. PCT/US2009/061144; International Filing Date Oct. 19, 2009; 5 pages.
The International Searching Authority, International Search Report, PCT/US2009/038161, Mailing date: Nov. 10, 2009, 7 pages.
ISO 180, Dec. 15, 2000, 16 pages.
The International Searching Authority, Written Opinion, PCT/US2009/038161, Mailing date: Nov. 10, 2009, 4 pages.
The International Searching Authority, International Search Report, PCT/US2009/061144, International Filing Date Oct. 19, 2009, Mailing date: May 27, 2010, 9 pages.
The International Searching Authority, Written Opinion, PCT/US2009/061144, International Filing Date Oct. 19, 2009, Mailing Date May 27, 2010 (5 pages).
ASTM D 648-07, Standard Test Method for Deflection Temperature of Plastics Under Flexural Load in the Edgewise Position.
ASTM D 3763-06, Standard Test Method for High Speed Puncture Properties of Plastics Using Load and Displacement Sensors.
ASTM D 3835 Standard Test Method for Determination of Properties of Polymeric Materials by Means of a Capillary Rheometer.
ISO 1133, Platics Determination of the melt mass-flow rate (MFR) and the melt volume-flow rate (MVR) of thermoplastics.
ISO 178, Plastics Determination of flexural properties.
UL 94 Tests for Flammability of Plastic Materials for Parts in Devices and Appliances.
D.H. Morton-Jones, "Polymer Processing", New York: Chapman & Hall, p. 35.

* cited by examiner

*Primary Examiner*—Peter Szekely
(74) *Attorney, Agent, or Firm*—Cantor Colburn LLP

(57) ABSTRACT

The molding defect known as "splay" is reduced in poly(arylene ether) injection molding compositions including specific amounts of poly(arylene ether), rubber-modified polystyrene, triaryl phosphate, and aryl phosphite. The molding compositions are particularly useful for injection molding articles with large, thin sections, such as battery cases for the back-up batteries used in wireless towers.

23 Claims, 1 Drawing Sheet

(a)
(b)
FIG.

INJECTION MOLDED ARTICLE AND METHOD FOR THE MANUFACTURE THEREOF

CROSS-REFERENCE TO RELATED APPLICATION

This application is a continuation of U.S. patent application Ser. No. 12/254,920, filed Oct. 21, 2008, which is incorporated herein by reference to the extent not inconsistent with the present disclosure.

BACKGROUND OF THE INVENTION

Poly(arylene ether)s are a class of plastics known for excellent water resistance, dimensional stability, and inherent flame retardancy, as well as high oxygen permeability and oxygen/nitrogen selectivity. Properties such as strength, stiffness, chemical resistance, and heat resistance can be tailored by blending poly(arylene ether)s with various other plastics in order to meet the requirements of a wide variety of consumer products, for example, plumbing fixtures, electrical boxes, automotive parts, and insulation for wire and cable.

Injection molding compositions including a poly(arylene ether), a rubber-modified polystyrene, and a flame retardant are commonly used to mold a variety of articles. These compositions are often explicitly characterized according to physical properties of molded test articles prepared from them, including objective metrics of stiffness (for example, flexural modulus), ductility (for example, notched Izod impact strength and tensile elongation at break), and heat resistance (for example, heat deflection temperature). Surface aesthetics are often an uncommunicated critical-to-quality metric for plastic articles prepared by injection molding. One common surface defect for injection-molded parts is known as splay, which is often described as splashes or fine lines that vary in color from the bulk of the molded part. Images of molded parts with and without splay are presented in the FIGURE. Splay is particularly a problem for molded parts with large, thin sections, such as, for example, plastic cases for the back-up batteries used in cell phone relay towers. The undesirable appearance of splay can lead to increased scrap rates and reduced productivity.

There is therefore a need for molding methods that reduce splay in the large, thin sections of articles molded from poly(arylene ether) compositions.

BRIEF DESCRIPTION OF THE INVENTION

In the course of their research directed at reducing splay in articles with large, thin sections molded from poly(arylene ether) compositions, the present inventors have determined that the degree of splay is strongly dependent on the chemical structure of a very minor component of the composition. Specifically, use of 0.1 to 1 weight percent of an aryl phosphite in place of an equivalent amount of the previously employed alkyl phosphite led to a substantial reduction in splay. Thus, one embodiment is a method of reducing splay in an injection molded article comprising a poly(arylene ether) composition, the method comprising: injection molding a poly(arylene ether) composition to form an injection molded article; wherein a portion of the injection molded article comprises a first dimension of at least 10 centimeters, a second dimension of at least 10 centimeters, and a third dimension of less than 1 centimeter; wherein the poly(arylene ether) composition comprises 45 to 65 weight percent of a poly(arylene ether) having an intrinsic viscosity of 0.3 to 0.55 deciliter/gram measured at 25° C. in chloroform, 15 to 35 weight percent of a rubber-modified polystyrene, wherein the rubber-modified polystyrene comprises polystyrene and polybutadiene, 5 to 25 weight percent of a triaryl phosphate that is a liquid at one atmosphere and at least one temperature in the range 25 to 50° C., and 0.1 to 1 weight percent of an aryl phosphite; wherein all weight percents are based on the total weight of the poly(arylene ether) composition.

Another embodiment is an injection molded article, wherein a portion of the injection molded article comprises a first dimension of at least 10 centimeters, a second dimension of at least 10 centimeters, and a third dimension of less than 1 centimeter; wherein the injection molded article is a product of injection molding a poly(arylene ether) composition comprising 45 to 65 weight percent of a poly(arylene ether) having an intrinsic viscosity of 0.3 to 0.55 deciliter/gram measured at 25° C. in chloroform, 15 to 35 weight percent of a rubber-modified polystyrene, wherein the rubber-modified polystyrene comprises polystyrene and polybutadiene, 5 to 25 weight percent of a triaryl phosphate that is a liquid at one atmosphere and at least one temperature in the range 25 to 50° C., and 0.1 to 1 weight percent of an aryl phosphite; wherein all weight percents are based on the total weight of the poly(arylene ether) composition.

Another embodiment is a method of forming an injection molded article comprising a poly(arylene ether) composition, the method comprising: injection molding a poly(arylene ether) composition to form an injection molded article; wherein a portion of the injection molded article comprises a first dimension of at least 10 centimeters, a second dimension of at least 10 centimeters, and a third dimension of less than 1 centimeter; wherein the poly(arylene ether) composition comprises 45 to 65 weight percent of a poly(arylene ether) having an intrinsic viscosity of 0.3 to 0.55 deciliter/gram measured at 25° C. in chloroform, 15 to 35 weight percent of a rubber-modified polystyrene, wherein the rubber-modified polystyrene comprises polystyrene and polybutadiene, 5 to 25 weight percent of a triaryl phosphate that is a liquid at one atmosphere and at least one temperature in the range 25 to 50° C., and 0.1 to 1 weight percent of an aryl phosphite; wherein all weight percents are based on the total weight of the poly(arylene ether) composition.

These and other embodiments are described in detail below.

BRIEF DESCRIPTION OF THE FIGURE

The FIGURE consists of images of molded battery cases (a) with splay, and (b) without splay.

DETAILED DESCRIPTION OF THE INVENTION

As mentioned above, the splay observed in articles injection molded from poly(arylene ether) compositions was substantially reduced when an aryl phosphite was substituted for the previously employed trialkyl phosphite. Since the phosphite component is employed at a very small concentration, typically 0.1 to 1 weight percent of the total poly(arylene ether) composition, it is very surprising that such a minor substitution could dramatically affect an important macroscopic property. Thus, one embodiment is a method of reducing splay in an injection molded article comprising a poly(arylene ether) composition, the method comprising: injection molding a poly(arylene ether) composition to form an injection molded article; wherein a portion of the injection molded article comprises a first dimension of at least 10 centimeters, a second dimension of at least 10 centimeters, and a third dimension of less than 1 centimeter; wherein the poly(arylene ether) composition comprises 45 to 65 weight percent of a poly(arylene ether) having an intrinsic viscosity of 0.3 to 0.55 deciliter/gram measured at 25° C. in chloroform, 15 to 35 weight percent of a rubber-modified polystyrene, wherein the rubber-modified polystyrene comprises polystyrene and polybutadiene, 5 to 25 weight percent of a triaryl phosphate that is a liquid at one atmosphere and at least one temperature in the range 25 to 50° C., and 0.1 to 1 weight percent of an aryl phosphite; wherein all weight percents are based on the total weight of the poly(arylene ether) composition.

The method is generally applicable to molded articles having large, thin sections. The method is especially useful for preparing injection molded articles comprising a portion having a first dimension of at least 10 centimeters, a second dimension of at least 10 centimeters, and a third dimension of less than 1 centimeter. Thus, the first and second dimensions define the "large" characteristic of the section, and the third dimension defines the "thin" characteristic of the section. The "portion" of the injection molded article can be, for example, one of the five planar faces (excluding the separate top) of a lead-acid battery container. In some embodiments, the first dimension is 10 to 100 centimeters, the second dimension is 10 to 100 centimeters, and the third dimension is 0.02 to 1 centimeter. In some embodiments, the first dimension is 30 to 100 centimeters, the second dimension is 30 to 100 centimeters, and the third dimension is 0.1 to 0.5 centimeter. In some embodiments, the injection molded article is a battery case having a mass of about 1,000 to about 4,000 grams, specifically about 1,500 to about 3,600 grams. Certain smaller battery cases have a mass of about 1,600 to about 1,800 grams, while certain larger battery cases have a mass of about 3,350 to about 3,550 grams.

In some embodiments, the first and second dimensions define a plane. For example, the molded article can be a battery case having an overall rectangular prism shape in which at least one wall is a (planar) rectangle.

The poly(arylene ether) composition comprises a poly (arylene ether). Suitable poly(arylene ether)s include those comprising repeating structural units having the formula

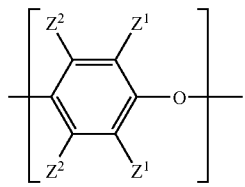

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue may also contain one or more carbonyl groups, amino groups, hydroxyl groups, or the like, or it may contain heteroatoms within the backbone of the hydrocarbyl residue. As one example, $Z^1$ may be a di-n-butylaminomethyl group formed by reaction of a terminal 3,5-dimethyl-1,4-phenyl group with the di-n-butylamine component of an oxidative polymerization catalyst.

In some embodiments, the poly(arylene ether) comprises 2,6-dimethyl-1,4-phenylene ether units, 2,3,6-trimethyl-1,4-phenylene ether units, or a combination thereof. In some embodiments, the poly(arylene ether) is a poly(2,6-dimethyl-1,4-phenylene ether).

The poly(arylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(arylene ether) can be in the form of a homopolymer, a copolymer, a graft copolymer, an ionomer, or a block copolymer, as well as combinations comprising at least one of the foregoing.

The poly(arylene ether) has an intrinsic viscosity of 0.3 to 0.55 deciliter per gram measured at 25° C. in chloroform. Specifically, the poly(arylene ether) intrinsic viscosity can be 0.35 to 0.5 deciliter per gram, more specifically 0.38 to 0.45 deciliter per gram.

The poly(arylene ether) composition comprises 45 to 65 weight percent of a poly(arylene ether), based on the total weight of the poly(arylene ether) composition. Within this range, the poly(arylene ether) amount can be 50 to 58 weight percent.

In addition to the poly(arylene ether), the poly(arylene ether) composition comprises a rubber-modified polystyrene. The rubber-modified polystyrene comprises polystyrene and polybutadiene. Rubber-modified polystyrenes are sometimes referred to as "high-impact polystyrenes" or "HIPS". In some embodiments, the rubber-modified polystyrene comprises 80 to 96 weight percent polystyrene, specifically 88 to 94 weight percent polystyrene; and 4 to 20 weight percent polybutadiene, specifically 6 to 12 weight percent polybutadiene. In some embodiments, the rubber-modified polystyrene has an effective gel content of 10 to 35 percent. Suitable rubber-modified polystyrenes are commercially available as, for example, GEH 1897 from SABIC Innovative Plastics, and D7022.27 from Chevron.

The poly(arylene ether) composition comprises 15 to 35 weight percent of the rubber-modified polystyrene, based on the total weight of the composition. Within this range, the rubber-modified polystyrene amount can be 21 to 29 weight percent.

In addition to the poly(arylene ether) and the rubber-modified polystyrene, the poly(arylene ether) composition comprises a triaryl phosphate that is a liquid at one atmosphere and at least one temperature in the range 25 to 50° C. Triaryl phosphates that are liquids at one atmosphere and at least one temperature in the range 25 to 50° C. include, for example, resorcinol bis(diphenyl phosphate), resorcinol bis(di-2,6-dimethylphenyl phosphate), bisphenol A bis(diphenyl phosphate), resorcinol bis(di-2,6-dimethylphenyl phosphate), alkylated triphenyl phosphates (such as methylated triphenyl phosphates and butylated triphenyl phosphates), and the like, and mixtures thereof.

The poly(arylene ether) composition comprises the triaryl phosphate in an amount of 5 to 25 weight percent, specifically 10 to 22 weight percent, more specifically 14 to 20 weight percent, based on the total weight of the poly(arylene ether) composition.

In addition to the poly(arylene ether), the rubber-modified polystyrene, and the triaryl phosphate, the poly(arylene ether) composition comprises an aryl phosphite. In general, the aryl phosphite is a phosphite comprising at least one aryloxy group covalently bound to a phosphitic phosphorus atom. In some embodiments, the aryl phosphite has the structure $P(OR^1)_3$, wherein each occurrence of $R^1$ is independently $C_1$-$C_{24}$ hydrocarbyl, provided that at least one occurrence of $R^1$ is an unsubstituted or substituted $C_6$-$C_{24}$ aryl. In some embodiments, each occurrence of $R^1$ is independently an unsubstituted or substituted $C_6$-$C_{24}$ aryl. In some embodiments, the aryl phosphite comprises tris(2,4-di-tert-butylphenyl)phosphite (CAS Reg. No. 31570-04-4).

The poly(arylene ether) composition comprises the aryl phosphite in an amount of 0.1 to 1 weight percent, specifically 0.3 to 0.5 weight percent, based on the total weight of the poly(arylene ether) composition.

In addition to the required components described above, the composition can, in some embodiments, include additional components. For example, in some embodiments, the poly(arylene ether) composition further comprises an unhydrogenated block copolymer of an alkenyl aromatic monomer and a conjugated diene. The alkenyl aromatic compound can be, for example, styrene, methyl styrene, t-butyl styrene, or the like. The conjugated diene can be, for example, butadiene, isoprene, or the like. Suitable unhydrogenated block copolymers include, for example, polystyrene-polybutadiene diblock copolymers and polystyrene-polybutadiene-polystyrene triblock copolymers. When present, the unhydrogenated block copolymer of an alkenyl aromatic monomer and a conjugated diene is used in an amount of 0.5 to 5 weight percent, specifically 1 to 2.5 weight percent, based on the total weight of the composition.

The poly(arylene ether) composition can, optionally, further comprise various additives known in the thermoplastics art. For example, the poly(arylene ether) composition can, optionally, further comprise an additive chosen from stabilizers, antioxidants, mold release agents, processing aids, drip retardants, nucleating agents, UV blockers, dyes, pigments, fragrances, anti-static agents, mineral oil, metal deactivators, antiblocking agents, and the like, and combinations thereof.

Components not taught herein as required or optional can, optionally, be excluded from the poly(arylene ether) composition. For example, in some embodiments, the poly(arylene ether) composition excludes any polymer other than the poly(arylene ether), the rubber-modified polystyrene, and the optional unhydrogenated block copolymer, provided that the poly(arylene ether) composition can comprise up to 2 weight percent of a polymeric mold release agent such as linear low-density polyethylene and/or up to 0.5 weight percent of a fluoropolymer-containing additive such as, for example, the polytetrafluoroethylene grafted and/or coated with poly(styrene-acrylonitrile), which is commonly referred to by the acronym TSAN. In some embodiments, the poly(arylene ether) composition excludes fillers. In some embodiments, the poly(arylene ether) composition excludes one or more of polyamides, polyesters, polyolefins, poly(alkenyl aromatic) homopolymers, poly(phenylene sulfide)s, and hydrogenated block copolymers of an alkenyl aromatic and a conjugated diene.

In some embodiments, the poly(arylene ether) composition excludes polyamides. In this context, the word "excludes" means that the poly(arylene ether) composition comprises less than or equal to 1 weight percent polyamide, specifically less than or equal to 0.1 weight percent polyamide, more specifically no polyamide.

In some embodiments, the poly(arylene ether) composition excludes polyesters. In this context, the word "excludes" means that the poly(arylene ether) composition comprises less than or equal to 1 weight percent polyester, specifically less than or equal to 0.1 weight percent polyester, more specifically no polyester.

In some embodiments, the poly(arylene ether) composition excludes polyolefins. In this context, the word "excludes" means that the poly(arylene ether) composition comprises less than or equal to 1 weight percent polyolefin, specifically less than or equal to 0.1 weight percent polyolefin, more specifically no polyolefin. As used herein, the term "polyolefin" refers to homopolymers and copolymers of $C_2$-$C_{18}$ alkenes comprising at least one aliphatic double bond.

In some embodiments, the poly(arylene ether) composition excludes alpha-olefin/hindered vinylidene monomer interpolymers. In this context, the word "excludes" means that the poly(arylene ether) composition comprises less than or equal to 1 weight percent alpha-olefin/hindered vinylidene monomer interpolymer, specifically less than or equal to 0.1 weight percent alpha-olefin/hindered vinylidene monomer interpolymer, more specifically no alpha-olefin/hindered vinylidene monomer interpolymer. "Alpha-olefin/hindered vinylidene monomer interpolymers" are copolymers of (1) a vinylidene aromatic monomer or a combination or a vinylidene aromatic monomer and a hindered aliphatic vinylidene monomer, and (2) a $C_2$-$C_{20}$ aliphatic alpha-olefin. These copolymers are further described and exemplified in U.S. Pat. No. 6,201,067 of Cheung et al.

In some embodiments, the poly(arylene ether) composition excludes hydrogenated block copolymers of an alkenyl aromatic compound and a conjugated diene. In this context, the word "excludes" means that the poly(arylene ether) composition comprises less than or equal to 1 weight percent of the hydrogenated block copolymer, specifically less than or equal to 0.1 weight percent hydrogenated block copolymer, more specifically no hydrogenated block copolymer. A "hydrogenated block copolymer" is a product of at least partially hydrogenating a poly(conjugated diene) block of a block copolymer of an alkenyl aromatic monomer and a conjugated diene.

In some embodiments, the poly(arylene ether) composition excludes homopolymers of alkenyl aromatic monomers. In this context, the word "excludes" means that the poly(arylene ether) composition comprises less than or equal to 1 weight percent of homopolymers of alkenyl aromatic monomers, specifically less than or equal to 0.1 weight percent homopolymers of alkenyl aromatic monomers, more specifically no homopolymers of alkenyl aromatic monomers. For example, the poly(arylene ether) composition can exclude homopolystyrene.

In some embodiments, the poly(arylene ether) composition excludes rubber-modified polystyrenes comprising hydrogenated polybutadiene. In this context, the word "excludes" means that the poly(arylene ether) composition comprises less than or equal to 1 weight percent rubber-modified polystyrene comprising hydrogenated polybutadiene, specifically less than or equal to 0.1 weight percent rubber-modified polystyrenes comprising hydrogenated polybutadiene, more specifically no rubber-modified polystyrenes comprising hydrogenated polybutadiene. A "rubber-modified polystyrenes comprising hydrogenated polybutadiene" is a product of at least partially hydrogenating the polybutadiene component of a rubber-modified polystyrene. Examples of rubber-modified polystyrenes comprising hydrogenated polybutadiene are provided in U.S. Patent Application Publication No. US 2007/0060677 A1 of Yoshida et al. In some embodiments, the poly(arylene ether) composition excludes homopolymers of alkenyl aromatic monomers and rubber-modified polystyrenes comprising hydrogenated polybutadiene.

In some embodiments, the poly(arylene ether) composition excludes aromatic amines. In this context, the word "excludes" means that the poly(arylene ether) composition comprises less than 0.1 weight percent aromatic amines, more specifically no aromatic amines. As used herein, the term "aromatic amines" refers to a compound in which at least one unsubstituted or substituted phenyl group is bound directly to an amine nitrogen atom. Examples of aromatic amines can be found in U.S. Pat. No. 6,350,514 B1 to Venderbosch.

In some embodiments, the poly(arylene ether) composition excludes fillers. In this context, the word "excludes" means that the poly(arylene ether) composition comprises less than or equal to 5 weight percent filler, specifically less than or equal to 3 weight percent filler, more specifically less than or equal to 1 weight percent filler, more specifically less than or equal to 0.5 weight percent filler, yet more specifically no filler. It will be understood that the exclusion of filler does not exclude small amounts of mineral pigments, such as titanium dioxide, when used to color the composition. In some embodiments, the poly(arylene ether) composition comprises no carbon black.

In some embodiments, the poly(arylene ether) composition has a shear thinning index of 8 to 18 measured at shear rates of 100 and 10,000 second$^{-1}$ at a temperature of 260 to 300° C. according to ASTM D3835. At 260° C., the shear thinning index can be 16 to 18. At 280° C., the shear thinning index can be 11 to 15. At 300° C., the shear thinning index can be 8 to 11.

The injection molded articles are recyclable. Thus, the poly(arylene ether) composition can comprise at least 5 weight percent of recycled content based on the total weight of the poly(arylene ether) composition. Specifically, the recycled content can be 5 to 50 weight percent, more specifically 10 to 40 weight percent, still more specifically 10 to 30 weight percent, even more specifically 10 to 20 weight percent. The recycled content can include material that has been recycled 1 to 10 times. An injection molded article prepared with recycled content will typically property values that are at least 85% of the corresponding values for an article molded from virgin resin.

A particularly advantageous example of recycling is the recycling of lead acid battery cases molded from the poly(arylene ether) composition. In this case, either the recycled content or the poly(arylene ether) composition as a whole can include 0.1 to 2 weight percent of lead (as elemental lead). Within this range, the lead content can be 0.2 to 1.3 weight percent, more specifically 0.4 to 0.8 weight percent. Recycling lead acid battery cases reduces the quantity of waste lead entering the environment.

In a very specific embodiment, a portion of the injection molded article comprises a first dimension of at least 30 centimeters and a second dimension of at least 20 centimeters; the poly(arylene ether) composition comprises 50 to 58 weight percent of the poly(arylene ether), wherein the poly(arylene ether) comprises a poly(2,6-dimethyl-1,4-phenylene ether), 21 to 29 weight percent of the rubber-modified polystyrene, 14 to 20 weight percent of the triaryl phosphate, wherein the triaryl phosphate comprises bisphenol A bis(diphenyl phosphate), and 0.3 to 0.5 weight percent of the aryl phosphite, wherein the aryl phosphite comprises a triaryl phosphite having the structure P(OR$^1$)$_3$, wherein each occurrence of R$^1$ is independently an unsubstituted or substituted C$_6$-C$_{24}$ aryl; and the poly(arylene ether) composition further comprises 1 to 2.5 weight percent of an unhydrogenated block copolymer of an alkenyl aromatic monomer and a conjugated diene.

The method can utilize conventional injection molding equipment, provided that the equipment has sufficient barrel capacity and tonnage to fill the mold(s) utilized to create the injection molded article. Illustrative equipment and conditions for injection molding are described in the working examples below.

In some embodiments, the injection molding comprises filling a barrel of an injection molding machine with the poly(arylene ether) composition and emptying at least 80 weight percent of the barrel to mold a single injection molded article.

The invention extends to the injection molded articles themselves. Thus, one embodiment is an injection molded article, wherein a portion of the injection molded article comprises a first dimension of at least 10 centimeters, a second dimension of at least 10 centimeters, and a third dimension of less than 1 centimeter; wherein the injection molded article is a product of injection molding a poly(arylene ether) composition comprising 45 to 65 weight percent of a poly(arylene ether) having an intrinsic viscosity of 0.3 to 0.55 deciliter/gram measured at 25° C. in chloroform, 15 to 35 weight percent of a rubber-modified polystyrene, wherein the rubber-modified polystyrene comprises polystyrene and polybutadiene, 5 to 25 weight percent of a triaryl phosphate that is a liquid at one atmosphere and at least one temperature in the range 25 to 50° C., and 0.1 to 1 weight percent of an aryl phosphite; wherein all weight percents are based on the total weight of the poly(arylene ether) composition. All of the various embodiments described above for the method of reducing splay in an injection molded article are equally applicable to the article itself.

Another embodiment is a method of forming an injection molded article comprising a poly(arylene ether) composition, the method comprising: injection molding a poly(arylene ether) composition to form an injection molded article; wherein a portion of the injection molded article comprises a first dimension of at least 10 centimeters, a second dimension of at least 10 centimeters, and a third dimension of less than 1 centimeter; wherein the poly(arylene ether) composition comprises 45 to 65 weight percent of a poly(arylene ether) having an intrinsic viscosity of 0.3 to 0.55 deciliter/gram measured at 25° C. in chloroform, 15 to 35 weight percent of a rubber-modified polystyrene, wherein the rubber-modified polystyrene comprises polystyrene and polybutadiene, 5 to 25 weight percent of a triaryl phosphate that is a liquid at one atmosphere and at least one temperature in the range 25 to 50° C., and 0.1 to 1 weight percent of an aryl phosphite; wherein all weight percents are based on the total weight of the poly(arylene ether) composition. All of the various embodiments described above for the method of reducing splay in an injection molded article are equally applicable to the method of forming an injection molded article.

The invention includes at least the following embodiments.

Embodiment 1

A method of reducing splay in an injection molded article comprising a poly(arylene ether) composition, the method comprising: injection molding a poly(arylene ether) composition to form an injection molded article; wherein a portion of the injection molded article comprises a first dimension of at least 10 centimeters, a second dimension of at least 10 centimeters, and a third dimension of less than 1 centimeter; wherein the poly(arylene ether) composition comprises 45 to 65 weight percent of a poly(arylene ether) having an intrinsic viscosity of 0.3 to 0.55 deciliter/gram measured at 25° C. in chloroform, 15 to 35 weight percent of a rubber-modified polystyrene, wherein the rubber-modified polystyrene comprises polystyrene and polybutadiene, 5 to 25 weight percent of a triaryl phosphate that is a liquid at one atmosphere and at least one temperature in the range 25 to 50° C., and 0.1 to 1 weight percent of an aryl phosphite; wherein all weight percents are based on the total weight of the poly(arylene ether) composition.

Embodiment 2

The method of embodiment 1, wherein the aryl phosphite has the structure $P(OR^1)_3$, wherein each occurrence of $R^1$ is independently $C_1$-$C_{24}$ hydrocarbyl, provided that at least one occurrence of $R^1$ is an unsubstituted or substituted $C_6$-$C_{24}$ aryl.

Embodiment 3

The method of embodiment 2, wherein each occurrence of $R^1$ is independently an unsubstituted or substituted $C_6$-$C_{24}$ aryl.

Embodiment 4

The method of any of embodiments 1-3, wherein the aryl phosphite comprises tris(2,4-di-tert-butylphenyl)phosphite.

Embodiment 5

The method of any of embodiments 1-4, wherein the poly(arylene ether) composition further comprises 0.5 to 5 weight percent of an unhydrogenated block copolymer of an alkenyl aromatic monomer and a conjugated diene.

Embodiment 6

The method of any of embodiments 1-5, wherein the injection molding comprises filling a barrel of an injection molding machine with the poly(arylene ether) composition and emptying at least 80 weight percent of the barrel to mold a single injection molded article.

Embodiment 7

The method of any of embodiments 1-6, wherein the poly(arylene ether) composition has a shear thinning index of 8 to 18 measured at shear rates of 100 and 10,000 second$^{-1}$ at a temperature of 260 to 300° C. according to ASTM D3835.

Embodiment 8

The method of any of embodiments 1-7, wherein the poly(arylene ether) composition comprises 5 to 50 weight percent of recycled content.

Embodiment 9

The method of embodiment 8, wherein the recycled content comprises material that has been recycled 1 to 10 times.

Embodiment 10

The method of embodiment 8 or 9, wherein the injection molded article is a case for a lead-acid battery; and wherein the recycled content comprises 0.1 to 2 weight percent lead based on the weight of the recycled content.

Embodiment 11

The method of any of embodiments 8-10, wherein the injection molded article is a case for a lead-acid battery; and wherein the poly(arylene ether) composition comprises 0.1 to 2 weight percent lead based on the total weight of the poly(arylene ether) composition.

Embodiment 12

The method of any of embodiments 1-11, wherein the poly(arylene ether) composition excludes polyamides.

Embodiment 13

The method of any of embodiments 1-12, wherein the poly(arylene ether) composition excludes polyesters.

Embodiment 14

The method of any of embodiments 1-13, wherein the poly(arylene ether) composition excludes polyolefins.

Embodiment 15

The method of any of embodiments 1-14, wherein the poly(arylene ether) composition excludes alpha-olefin/hindered vinylidene monomer interpolymers.

Embodiment 16

The method of any of embodiments 1-15, wherein the poly(arylene ether) composition excludes hydrogenated block copolymers of an alkenyl aromatic compound and a conjugated diene.

Embodiment 17

The method of any of embodiments 1-16, wherein the poly(arylene ether) composition excludes homopolymers of alkenyl aromatic monomers.

Embodiment 18

The method of any of embodiments 1-17, wherein the poly(arylene ether) composition excludes rubber-modified polystyrenes comprising hydrogenated polybutadiene.

Embodiment 19

The method of any of embodiments 1-18, wherein the poly(arylene ether) composition excludes homopolymers of alkenyl aromatic monomers and rubber-modified polystyrenes comprising hydrogenated polybutadiene.

Embodiment 20

The method of any of embodiments 1-19, wherein the poly(arylene ether) composition excludes aromatic amines.

Embodiment 21

The method of any of embodiments 1-20, wherein the poly(arylene ether) composition excludes fillers.

Embodiment 22

The method of embodiment 1, wherein a portion of the injection molded article comprises a first dimension of at least 30 centimeters and a second dimension of at least 20 centimeters; wherein the poly(arylene ether) composition comprises 50 to 58 weight percent of the poly(arylene ether), wherein the poly(arylene ether) comprises a poly(2,6-dimethyl-1,4-phenylene ether); 21 to 29 weight percent of the rubber-modified polystyrene, 14 to 20 weight percent of the triaryl phosphate, wherein the triaryl phosphate comprises bisphenol A bis(diphenyl phosphate), and 0.3 to 0.5 weight percent of the aryl phosphite, wherein the aryl phosphite comprises a triaryl phosphite having the structure $P(OR^1)_3$, wherein each occurrence of $R^1$ is independently an unsubstituted or substituted $C_6$-$C_{24}$ aryl; and wherein the poly(arylene ether) composition further comprises 1 to 2.5 weight percent of an unhydrogenated block copolymer of an alkenyl aromatic monomer and a conjugated diene.

Embodiment 23

An injection molded article, wherein a portion of the injection molded article comprises a first dimension of at least 10 centimeters, a second dimension of at least 10 centimeters, and a third dimension of less than 1 centimeter; wherein the injection molded article is a product of injection molding a poly(arylene ether) composition comprising 45 to 65 weight percent of a poly(arylene ether) having an intrinsic viscosity of 0.3 to 0.55 deciliter/gram measured at 25° C. in chloroform, 15 to 35 weight percent of a rubber-modified polystyrene, wherein the rubber-modified polystyrene comprises polystyrene and polybutadiene, 5 to 25 weight percent of a triaryl phosphate that is a liquid at one atmosphere and at least one temperature in the range 25 to 50° C., and 0.1 to 1 weight percent of an aryl phosphite; wherein all weight percents are based on the total weight of the poly(arylene ether) composition.

Embodiment 24

A method of forming an injection molded article comprising a poly(arylene ether) composition, the method comprising: injection molding a poly(arylene ether) composition to form an injection molded article; wherein a portion of the injection molded article comprises a first dimension of at least 10 centimeters, a second dimension of at least 10 centimeters, and a third dimension of less than 1 centimeter; wherein the poly(arylene ether) composition comprises 45 to 65 weight percent of a poly(arylene ether) having an intrinsic viscosity of 0.3 to 0.55 deciliter/gram measured at 25° C. in chloroform, 15 to 35 weight percent of a rubber-modified polystyrene, wherein the rubber-modified polystyrene comprises polystyrene and polybutadiene, 5 to 25 weight percent of a triaryl phosphate that is a liquid at one atmosphere and at least one temperature in the range 25 to 50° C., and 0.1 to 1 weight percent of an aryl phosphite; wherein all weight percents are based on the total weight of the poly(arylene ether) composition.

The invention is further illustrated by the following non-limiting examples.

Example 1 and Comparative Example 1

Two thermoplastic compositions were prepared using the components listed in Table 1.

TABLE 1

| Component Designation | Description |
| --- | --- |
| PPE | Poly(2,6-dimethyl-1,4-phenylene ether) having an intrinsic viscosity of 0.40 deciliter per gram as measured in chloroform at 25° C.; obtained as PPO 640 from SABIC Innovative Plastics. |
| Zinc sulfide | Zinc sulfide (CAS Reg. No. 1314-98-3); obtained as SACHTOLITH HD from Sachtleben. |
| Zinc oxide | Zinc oxide (CAS Reg. No. 1314-13-2); obtained as CR-4 from GH Chemicals Ltd. |
| SBS | Polystyrene-polybutadiene-polystyrene triblock copolymer (CAS Reg. No. 9003-55-8) having a polystyrene content of 31%; obtained as KRATON D1101 from Kraton Polymers. |
| TSAN | Styrene-acrylonitrile encapsulated polytetrafluoroethylene resin (CAS Reg. No. 9002-84-0); obtained as TSAN from SABIC Innovative Plastics. |
| LLDPE | Linear low density polyethylene (CAS Reg. No. 25087-34-7); obtained as ESCORENE LL-5100.09 from ExxonMobil. |
| Antioxidant 1 | Triisodecyl phosphite (CAS Reg. No. 25448-25-3); obtained as TDP from Chemtura. |
| Antioxidant 2 | Tris(2,4-di-t-butylphenyl) phosphite (CAS Reg. No. 31570-04-4); obtained as IRGAFOS 168 from Ciba Specialty Chemicals. |
| HIPS | High-impact polystyrene (rubber-modified polystyrene) having a polystyrene content of about 90 weight percent and a polybutadiene content of 10 weight percent; obtained as FX510 from NOVA Chemicals. |

TABLE 1-continued

| Component Designation | Description |
|---|---|
| BPADP | Bisphenol A bis(diphenyl phosphate) (CAS Reg. No. 5945-33-5); obtained as BPADP from Supresta. |
| Titanium dioxide | Titanium dioxide having an average particle size of 0.2 micrometer; obtained as Ti-Pure R103-15 from DuPont. |
| Solvent green 3 | 1,4-bis-(p-toluidino)-9,10-anthraquinone (CAS Reg. No. 128-80-3); obtained as MACROLEX Green 5B from Lanxess Corp. |
| Pigment red 101 | Iron (III) oxide, red (CAS Reg. No. 1309-37-1); obtained as BAYFERROX 180 M from Lanxess Corp. |
| Carbon black | Carbon black having an iodine absorption of 231 grams per kilogram as determined by ASTM D1510-02a; obtained as MONARCH 800 from Cabot. |
| Pigment yellow 53 | Nickel antimony titanium yellow rutile (CAS Reg. No. 8007-18-9); obtained as SICOTAN Yellow 1010 from BASF. |

Two poly(arylene ether) compositions varying only in antioxidant type were prepared under identical conditions. Antioxidant 1, used in Comparative Example 1, is the alkyl phosphite, triisodecyl phosphite. Antioxidant 2, used in Example 1, is the aryl phosphite, tris(2,4-di-t-butylphenyl)phosphite. The formulations are shown in Table 2, where all component amounts are in weight percent, based on the total weight of the composition. Compositions were prepared by melt kneading on a Werner & Pfleiderer 53 millimeter co-rotating twin-screw extruder having 11 barrels and a screw length to diameter ratio (L/D) of about 38:1. The extruder was run at a screw rotation rate of 300 rotations per minute and a throughput of about 250 pounds/hour (113 kilograms/hour). Barrel set temperatures were 350° F.-500° F.-500° F.-550° F. (177° C.-260° C.-260° C.-288° C.) from the feedthroat to the die and liquid flame retardant was pumped directly into the extruder between barrels 3 and 4. Extruded strands were cooled in a water bath prior to being chopped with a pelletizer.

TABLE 2

|  | C. Ex. 1 | Ex. 1 |
|---|---|---|
| PPE | 53.72 | 53.72 |
| Zinc sulfide | 0.12 | 0.12 |
| Zinc oxide | 0.12 | 0.12 |
| SBS | 1.58 | 1.58 |
| TSAN | 0.24 | 0.24 |
| LLDPE | 0.98 | 0.98 |
| Antioxidant 1 | 0.39 | 0 |
| Antioxidant 2 | 0 | 0.39 |
| HIPS | 24.56 | 24.56 |
| BPADP | 16.73 | 16.73 |
| Titanium dioxide | 1.16 | 1.16 |
| Solvent green 3 | 0.02 | 0.02 |
| Pigment red 101 | 0.02 | 0.02 |
| Carbon black | 0.06 | 0.06 |
| Pigment yellow 53 | 0.32 | 0.32 |

Thirty-two (32) and twenty-four (24) test parts were injection molded in a large (55 centimeters×30 centimeters×12 centimeters) battery case tool for Comparative Example 1 and Inventive Example 1, respectively. Injection molding was carried out on a 500 ton Toyo press. A flat barrel temperature profile of about 530 to 570° F. (about 277 to 299° C.) and tool temperatures of about 120 to 150° F. (about 49 to 66° C.) were employed. Cycle times were on the order of 120 seconds. Splay defects were observed on 6 parts (18.75%) for Comparative Example 1 and on 1 part (4.17%) for Inventive Example 1. Inventive Example 1 had a lower reject rate for splay than Comparative Example 1 with 90% confidence.

Representative images of battery cases with splay (image (a); molded from the Comparative Example 1 composition) and without splay (image (b); molded from the Example 1 composition) are presented in the FIGURE.

Examples 2 and 3, Comparative Example 2

These examples illustrate preparation of the inventive Example 1 and Comparative Example 1 compositions on a larger scale. For this purpose, the compositions were prepared on a Werner & Pfeiderer 120 millimeter, three-lobe co-rotating twin-screw extruder having 11 barrels and L/D of about 34.5. The throughput ranged from about 2,600 to 4,000 pounds per hour (about 1,179 to 1,814 kilograms/hour). Liquid flame retardant was pumped directly into the extruder at barrel 2. Barrel set temperatures were 350° F.-450° F.-500° F.-500° F.-550° F. (177° C.-232° C.-260° C.-260° C.-288° C.) from feedthroat to die. After cooling through a water bath and palletizing, medium-sized (40 centimeters×27 centimeters× 11 centimeters) battery cases were prepared by injection molding. Variations in compounding conditions were summarized with the quantity Mixing Energy. Mixing Energy was calculated using the following equation:

$$ME = \left[ \frac{\% \text{ Torque} \times MaximumTorque \times RPM}{Rate} \right] \times Const.$$

where ME is the Mixing Energy in units of kilowatt-hours per kilogram (kW-hr/kg), % Torque is the percent of maximum torque for the extruder in units of percent, MaximumTorque is the maximum torque for the extruder in units of Newton-meters, RPM is the screw rotation rate in rotations per minute, Rate is the throughput rate in pounds per hour, and Const. has a value of $2.306 \times 10^{-6}$ in these experiments.

The results in Table 3 show, surprisingly, that the amount of scrap caused by splay in the molded articles varied with compounding conditions for creating the resin composition used as the material input for injection molding. Example 2 shows a reduction in the scrap rate that is statistically significant compared to Comparative Example 2, while Example 3 has the lowest scrap rate of all (reduced significantly compared to Example 2). It therefore appears there is an optimum energy input for compounding the resin composition in order to minimize splay (and hence the scrap rate) in injection molded parts prepared from the resin composition.

TABLE 3

| | C. Ex. 2 | Ex. 2 | Ex. 3 |
|---|---|---|---|
| Screw rotation rate (rpm) | 280 | 280 | 330 |
| Torque (%) | 63 | 62 | 64 |
| Throughput rate (lb/hr) | 3900 | 2600 | 4000 |
| Mixing Energy (kW-hr/kg) | 0.164 | 0.224 | 0.191 |
| No. of cases | 1485 | 2376 | 1480 |
| No. of splay defects | 72 | 80 | 17 |
| Scrap (%) | 4.85 | 3.37 | 1.15 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of reducing splay in an injection molded article comprising a poly(arylene ether) composition, the method comprising:
    injection molding a poly(arylene ether) composition to form an injection molded article; wherein the injection molding comprises filling a barrel of an injection molding machine with the poly(arylene ether) composition and emptying at least 80 weight percent of the barrel to mold a single injection molded article;
    wherein a portion of the injection molded article comprises
        a first dimension of at least 10 centimeters,
        a second dimension of at least 10 centimeters, and
        a third dimension of less than 1 centimeter;
    wherein the poly(arylene ether) composition comprises
        45 to 65 weight percent of a poly(arylene ether) having an intrinsic viscosity of 0.3 to 0.55 deciliter/gram measured at 25° C. in chloroform,
        15 to 35 weight percent of a rubber-modified polystyrene, wherein the rubber-modified polystyrene comprises polystyrene and polybutadiene,
        5 to 25 weight percent of a triaryl phosphate that is a liquid at one atmosphere and at least one temperature in the range 25 to 50° C., and
        0.1 to 1 weight percent of an aryl phosphite having the structure $P(OR^1)_3$, wherein each occurrence of $R^1$ is independently $C_1$-$C_{24}$ hydrocarbyl, provided that at least one occurrence of $R^1$ is an unsubstituted or substituted $C_6$-$C_{24}$ aryl;
    wherein all weight percents are based on the total weight of the poly(arylene ether) composition.

2. The method of claim 1, wherein each occurrence of $R^1$ is independently an unsubstituted or substituted $C_6$-$C_{24}$ aryl.

3. The method of claim 1, wherein the aryl phosphite comprises tris(2,4-di-tert-butylphenyl)phosphite.

4. The method of claim 1, wherein the poly(arylene ether) composition further comprises 0.5 to 5 weight percent of an unhydrogenated block copolymer of an alkenyl aromatic monomer and a conjugated diene.

5. The method of claim 1, wherein the poly(arylene ether) composition comprises 5 to 50 weight percent of recycled content.

6. The method of claim 5, wherein the recycled content comprises material that has been recycled 1 to 10 times.

7. The method of claim 5, wherein the injection molded article is a case for a lead-acid battery; and wherein the recycled content comprises 0.1 to 2 weight percent lead based on the weight of the recycled content.

8. The method of claim 5, wherein the injection molded article is a case for a lead-acid battery; and wherein the poly(arylene ether) composition comprises 0.1 to 2 weight percent lead based on the total weight of the poly(arylene ether) composition.

9. The method of claim 1, wherein the poly(arylene ether) composition excludes polyamides.

10. The method of claim 1, wherein the poly(arylene ether) composition excludes polyesters.

11. The method of claim 1, wherein the poly(arylene ether) composition excludes polyolefins.

12. The method of claim 1, wherein the poly(arylene ether) composition excludes alpha-olefin/hindered vinylidene monomer interpolymers.

13. The method of claim 1, wherein the poly(arylene ether) composition excludes hydrogenated block copolymers of an alkenyl aromatic compound and a conjugated diene.

14. The method of claim 1, wherein the poly(arylene ether) composition excludes homopolymers of alkenyl aromatic monomers.

15. The method of claim 1, wherein the poly(arylene ether) composition excludes rubber-modified polystyrenes comprising hydrogenated polybutadiene.

16. The method of claim 1, wherein the poly(arylene ether) composition excludes homopolymers of alkenyl aromatic monomers and rubber-modified polystyrenes comprising hydrogenated polybutadiene.

17. The method of claim 1, wherein the poly(arylene ether) composition excludes aromatic amines.

18. The method of claim 1, wherein the poly(arylene ether) composition excludes fillers.

19. The method of claim 1,
    wherein a portion of the injection molded article comprises a first dimension of at least 30 centimeters and a second dimension of at least 20 centimeters;
    wherein the poly(arylene ether) composition comprises
        50 to 58 weight percent of the poly(arylene ether), wherein the poly(arylene ether) comprises a poly(2,6-dimethyl-1,4-phenylene ether);
        21 to 29 weight percent of the rubber-modified polystyrene, 14 to 20 weight percent of the triaryl phosphate, wherein the triaryl phosphate comprises bisphenol A bis(diphenyl phosphate), and 0.3 to 0.5 weight percent of the aryl phosphite; and wherein the poly(arylene ether) composition further comprises 1 to 2.5 weight percent of an unhydrogenated block copolymer of an alkenyl aromatic monomer and a conjugated diene.

20. An injection molded article prepared by the method of claim 1.

21. The injection molded article of claim 20, wherein injection molded article is a battery case.

22. The injection molded article of claim 20, wherein the injection molded article is a case for a lead-acid battery.

23. The injection molded article of claim 22, wherein the poly(arylene ether) composition comprises 0.1 to 2 weight percent lead based on the total weight of the poly(arylene ether) composition.

* * * * *